United States Patent [19]

Saito

[11] Patent Number: 5,426,627

[45] Date of Patent: Jun. 20, 1995

[54] OPTICAL INFORMATION RECORDING/REPRODUCING APPARATUS

[75] Inventor: Akito Saito, Hino, Japan

[73] Assignee: Olympus Optical Co., Ltd., Tokyo, Japan

[21] Appl. No.: 28,619

[22] Filed: Mar. 8, 1993

Related U.S. Application Data

[63] Continuation of Ser. No. 648,765, Jan. 31, 1990, abandoned.

[30] Foreign Application Priority Data

Feb. 9, 1990 [JP] Japan .................... 2-28187

[51] Int. Cl.[6] .............................. G11B 7/00
[52] U.S. Cl. ..................... 369/54; 369/44.25; 369/44.33; 369/32
[58] Field of Search ............ 369/54, 44.32, 44.31, 369/32, 44.11, 44.28, 44.27, 44.29, 58, 44.26, 44.33, 44.34, 116, 48, 124, 44.25

[56] References Cited

U.S. PATENT DOCUMENTS

| | | | |
|---|---|---|---|
| 4,800,546 | 1/1989 | Shikichi et al. | 369/44.28 |
| 4,912,697 | 3/1990 | Enari et al. | 369/116 |
| 4,955,011 | 9/1990 | Baba | 369/32 |
| 4,977,539 | 12/1990 | Lee | 369/44.11 |
| 4,982,393 | 1/1991 | Matsushita et al. | 369/44.32 |
| 4,982,394 | 1/1991 | Kanda et al. | 369/44.32 |
| 4,989,190 | 1/1991 | Kuro et al. | 369/58 |
| 5,083,301 | 1/1992 | Matoba et al. | 369/44.28 |
| 5,257,255 | 10/1993 | Morimoto et al. | 369/44.31 |

*Primary Examiner*—Georgia Y. Epps
*Assistant Examiner*—Nabil Hindi
*Attorney, Agent, or Firm*—Stevens, Davis, Miller & Mosher

[57] ABSTRACT

An optical information recording and/or reproducing apparatus, wherein an information recording medium and an optical head are moved relatively in a track direction to record optical information in the information recording medium and/or reproducing optical information recorded in the information recording medium. In the apparatus a relative moving speed between said information recording medium and said optical head is detected, and it is arranged such that the optical information is not recorded and/or reproduced when the detected relative moving speed deviates from a given speed. Therefore, in the apparatus, there would not occur accidents wherein (1) optical information is recorded on not only a recording area but also ID portions that are formed on the information recording medium, and (2) proper reproduction of information cannot be conducted because the relative moving speed between the information recording medium and the optical head is too fast and the reproducing signals occur too late to coincide with pits formed on the information recording medium.

4 Claims, 3 Drawing Sheets

FIG_1

OPTICAL INFORMATION RECORDING/REPRODUCING APPARATUS

This application is a continuation of application Ser. No. 07/648,765, filed Jan. 31, 1990, (abandoned).

BACKGROUND OF THE INVENTION

1. Field of the Invention

The present invention relates to an optical information recording and/or reproducing apparatus in which optical information is recorded and/or reproduced with the aid of an information recording medium such as an optical card. In the apparatus according to the invention, the optical card and an optical head are moved relatively in a track direction, which is parallel to the extending direction of tracks formed on the optical card, to record optical information on the optical card and/or reproduce optical information recorded on the optical card; additionally, the relative moving speed between the optical card and the optical head is controlled at a given speed in order to prevent errors in recording and/or reproducing optical information on the optical card.

2. Prior Art Statement

On an optical information recording medium such as an optical card, it is impossible to re-write optical information in an area that has already been written thereon. But a an optical card has a great memory capacity, i.e. about several thousand times to ten thousand times as large as that of a magnetic card. The optical card has a memory capacity of about from one to two megabytes, so that a many applications such as a bankbook, a pocket map and a prepaid card for shopping can be considered.

Many optical card constructions have been suggested; and one of the constructions of the optical card, which has been suggested by the applicant in Japanese Preliminarily Laid-open Publication No. 63-37876, is shown in FIG. 1. On the optical card 41, there is provided an optical information recording portion 42. The optical information recording portion 42 comprises a plurality of tracks 43 which are formed in a longitudinal direction of the optical card 41, being parallel to each other. On both sides of the optical information recording portion 42, there are arranged ID portions 44 and 45, respectively. In each ID portion 44 and 45, address information corresponding to each track 43 is recorded. Since the ID portions 44 and 45 are provided on both sides of the optical card 41, the address information recorded thereon can be read out even when the optical card 41 is moved with respect to the optical head either from right side to left side or from left side to right side. As apparent from FIG. 1, the ID portions 44 and 45 are arranged inside by a given distance from both ends of the optical card 41 in order to prevent the influence of a defect or dirt formed on the edge portions of the optical card 41 and in order to relatively move the optical card and the optical head at a constant speed between ID portions 44 and 45. When recording and/or reproducing optical information on the optical card 41 from left to right, the address information recorded on the left side ID portion 44 is read out to identify the position of the optical head with respect to the optical card; and when recording and/or reproducing optical information on the optical card 41 from right to left, the address information recorded on the right side ID portion 45 is read out.

When optical information is recorded on the optical card 41 by the apparatus, the optical cards should be reciprocally moved in the track direction between the ID portion 44 and the ID portion 45 at a constant speed. While, in a clock pulse generating circuit equipped in the apparatus, clock pulses each having a given frequency are produced; and then optical information is recorded simultaneously with the clock pulses. It should be noted that the optical head may be arranged to move in the track direction instead of the optical card. On the other hand, when optical information recorded on the optical card 41 is reproduced, information reproducing signals are reproduced in accordance with the clock pulses.

In the conventional optical information recording/reproducing apparatus, the relative moving speed of the optical card 41 between the ID portions 44 and 45 is controlled with respect to the optical head to be kept at a given constant speed. However, there still remain a possibility that the relative moving speed between the optical card 41 and the optical head is greater than or lesser than the given constant speed for some causes. When such deviation of the relative moving speed is caused when optical information recorded on the optical card is reproduced, the pulses do not properly correspond to optical information pits formed on the information tracks of the optical card 41, so that information recorded on the optical card cannot be reproduced correctly. On the other hand, when such deviation of the relative moving speed is caused when optical information is recorded on the optical card 41, there can be the problem that optical information is recorded not only on the recording portion 46 but also on the ID portions 44 and 45. Particularly, in the optical card on which two ID portions are arranged on the both sides of the optical card, there is a great possibility of such a mistake.

SUMMARY OF THE INVENTION

The present invention has for its purpose to provide an optical information recording/reproducing apparatus in which the relative moving speed between the optical card and the optical head can be detected and it is possible to control the function of the apparatus so as to stop to record and/or reproduce optical information if the relative moving speed is greater than or lesser than the given speed.

In order to carry out the above purpose, the optical information recording and/or reproducing apparatus, wherein:
 driving means for relatively moving an optical information recording medium and an optical head in the track direction;
 moving speed detecting means for detecting relative moving speed between said optical information recording medium and said optical head: and
 controlling means for inhibiting the recording of optical information on said optical information recording medium and/or to reproduce optical information recorded on said optical information recording medium when said relative moving speed detected by the moving speed detecting means is deviated from a given speed.

In the apparatus according to the present invention, the relative moving speed between the optical information recording medium and the optical head is detected; and it is arranged that when the detected moving speed is largely deviated from the given value, recording and/or reproducing optical information on the optical information recording medium is not effected. Therefore, it is possible to prevent errors in recording and/or reproducing optical information caused by disarrangement of the relative moving speed between the optical information recording medium and the optical head.

DETAILED EXPLANATION OF THE PREFERRED EMBODIMENTS

Figure 1:
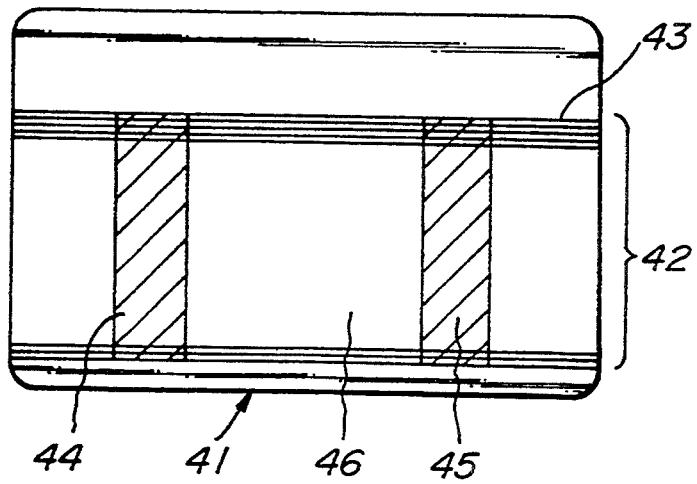
FIG. 1 is a schematic view showing an optical card which is commonly used in the conventional optical information recording/reproducing apparatus and the apparatus according to the invention as an optical information recording medium.
Figure 2:
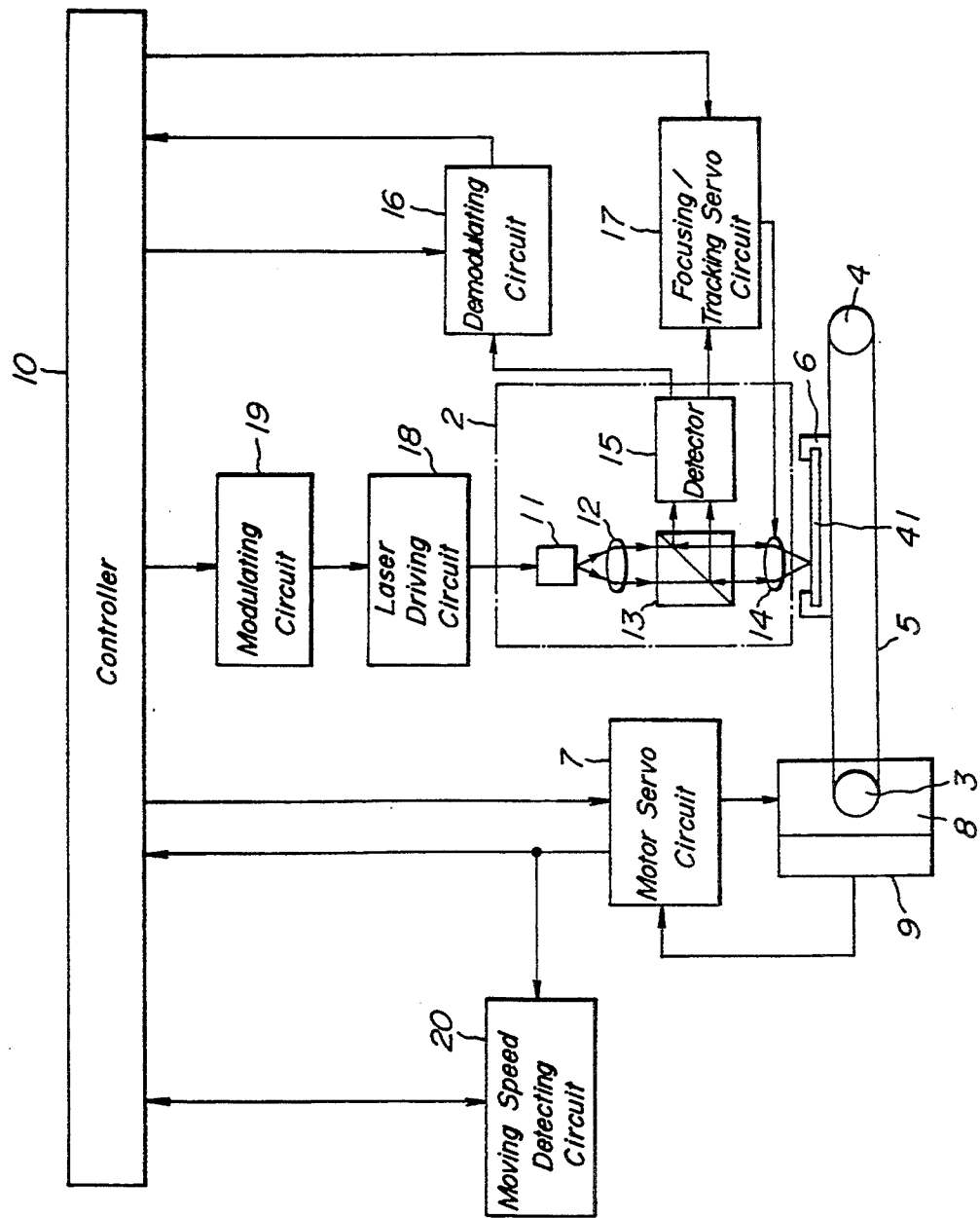
FIG. 2 is a block diagram depicting the whole constitution of the optical information recording/reproducing apparatus according to the invention.

FIG. 2 is a block diagram showing the whole construction of one embodiment of the optical information recording/reproducing apparatus according to the invention. In the apparatus shown in FIG. 2, it is arranged such that an optical card 41 is reciprocally transferred in a track direction, which extends parallel to the tracks formed on the optical card 41, and an optical head 2 is moved in a tracking direction, which is perpendicular to the track direction, to record optical data on the optical card 41 and/or reproduce optical data recorded on the optical card 41. The optical card 41 is mounted on a shuttle 6 which is arranged on a transfer belt 5. The transfer belt 5 is passed round pulleys 3 and 4. The shuttle 6 is arranged to reciprocally transfer the shuttle 6 in the track direction by means of a motor 8. The moving speed of the shuttle 6 is controlled by a motor servo circuit 7 made constant at a predetermined speed. It should be noted that the structure of the optical card 41 is the same as that of the optical card shown in FIG. 1, and therefore the same numerical references as those of the card shown in FIG. 1 will be used in the following explanation.

A rotary encoder 9 is arranged to a shaft of the motor 8 in order to detect a position of the shuttle 6 with respect to the optical head 2. It is arranged such that one pulse of the rotary encoder 9 is corresponding to 50 μm of a moving distance of the shuttle 6. Positional information of the shuttle 6 is supplied to a controller 10 via the motor servo circuit 7; and the controller 10 supplies an order to said motor servo circuit 7 to move the shuttle 6 at a given constant speed during when a light beam emanated from the optical head 2 is traced on the information recording area 46, which is provided between ID portions 44 and 45.

The optical head 2 comprises a laser diode 11 as a light source, a collimator lens 12, a prism 13, an objective lens 14 and a photodetector 15. The laser beam for writing/reading information emanated from the laser diode 11 is made incident upon the optical card 41 via the collimator lens 12, the prism 13 and the objective lens 14; and then the light beam is reflected by the optical card 41 and made incident upon the photodetector 15 after the direction thereof is changed 90 degrees by means of the prism 13.

The output of the photodetector 15 is supplied to a demodulating circuit 16 to obtain an information reproducing signal therefrom and the output is also supplied to a focusing and tracking servo circuit 17 to detect a focusing error signal and a tracking error signal. The optical head 2 is driven in focusing and tracking directions in accordance with the focusing error signal and the tracking error signal detected by the focusing and tracking servo circuit 17 in order to let the incident light beam always trace on the track 43 in a focus condition.

The controller 10 is connected to the laser diode 11 via a laser diode driving circuit 18 and a modulating circuit 19. When information data recorded on the optical card 41 are read out, modulation is not conducted in the modulating circuit 19 under the control of the controller 10, and the laser driving circuit 18 supplies an order to the laser diode 11 to produce a light beam having a low power for reading information recorded on the optical card 41.

The controller 10 is also connected to the motor servo circuit 7, the demodulating circuit 16 and the focusing/tracking servo circuit 17. The driving modes of these circuits are controlled by the controller 10 such that a desired track is sought in accordance with track address information demodulated by the demodulating circuit 16 to reproduce optical information recorded on the relevant track and/or to record optical information thereon. When optical information is recorded on the optical card 41, writing data supplied from outside to the controller 10 are modulated in the modulating circuit 15 in accordance with clock pulses having a predetermined frequency and a laser beam having a high power is emitted from the laser diode 11 via the laser driving circuit 18, in which the laser power is modulated in accordance with the writing data.

Figure 3:
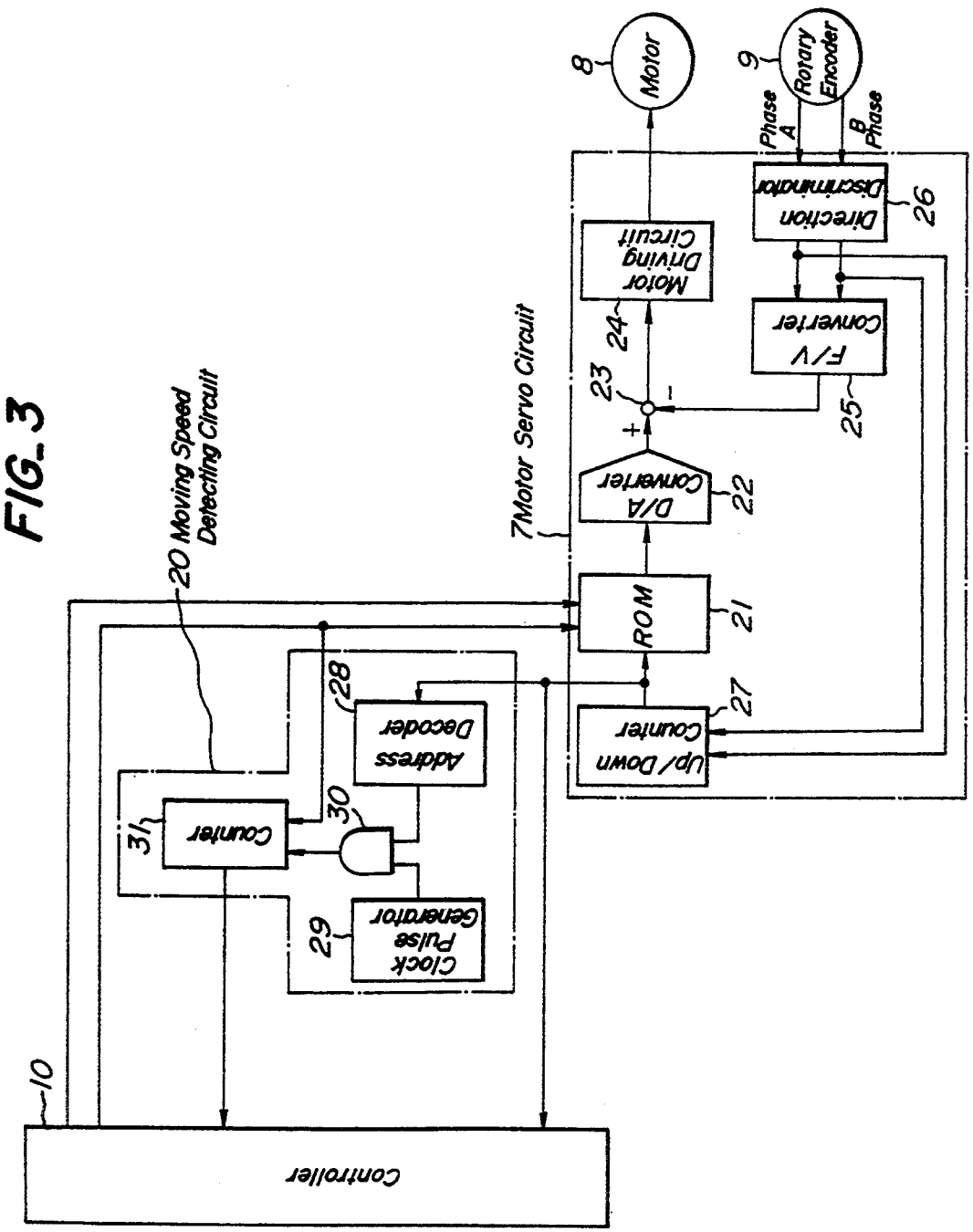
FIG. 3 is a block diagram of a moving speed detecting circuit and a motor servo circuit which are provided in the apparatus according to the invention.

To the motor servo circuit 7, is connected a moving speed detecting circuit 20 for detecting the relative moving speed of the optical card 41 with respect to the optical head 2. FIG. 3 is a circuit diagram representing constructions of the moving speed detecting circuit 20 and the motor servo circuit 7. The motor servo circuit 7 comprises a ROM 21, a D/A converter 22, a subtracter 23, a motor driving circuit 24, an F/V converter 25, a direction discriminator 26 and an up and down counter 27. The moving speed detecting circuit 20 comprises an address decoder 28, a clock pulse generator 29, an AND circuit 30 and a counter 31.

The shuttle 6 is reciprocally moved in the track direction by means of the motor 8. In the ROM 21, the mode for controlling the movement of the shuttle 6 is changed between a position controlling mode and a moving speed controlling mode in accordance with the driving signal supplied from the controller 10 to the ROM 21 of the motor servo circuit 7. In ROM 21, one address is arranged to be corresponding to a moving distance of 50 μm of the shuttle 6. Data are recorded in ROM 21 such that when the driving signal is not active the movement of the shuttle 6 is controlled in the position controlling mode to be positioned at one end portion of the optical card 41, i.e. outside of ID portion 44 or 45; and when the driving signal is active, the shuttle 6 is controlled in the moving speed controlling mode to be moved to a forward or a backward direction in accordance with the driving direction signal, which is also supplied from the controller 10. It should be noted that the forward direction means a direction from the left side ID portion 44 to the right side ID portion 45; and the backward direction means a direction from the right side ID portion 45 to the left side ID portion 44.

In order to move the shuttle 6 in the forward direction, the driving direction signal is changed to a forward direction level and then the driving signal is made active after the position of the shuttle 6 is decided such that the optical head 2 is positioned at the left side end portion of the optical card 41. Then a driving data (target speed) of the shuttle 6 memorized in ROM 21 is supplied to the motor 8 via the D/A converter 22 and the motor driving circuit 24. The shuttle 6 is moved in the forward direction in response to the signal from ROM 21; thereafter an A phase output or B phase output of the rotary encoder 9, which is provided on the same shaft of the motor 8, is supplied to the direction discriminator 26; additionally an output of the discriminator 26 is supplied to the F/V convertor 25 and the up and down counter 27. In the up and down counter 27, whose output indicates the position of the shuttle 6 with respect to the optical head 2, the counted value is made clear when the phase of the output of the direction discriminator 26 is changed. The output of the F/V convertor 25 is further supplied to a subtracter 23, in which a difference between the output of the F/V convertor 25 and the D/A convertor 22 is detected. The rotation of the motor 8, i.e. the moving speed of the shuttle 6, is controlled in the motor driving circuit 24 so as to make the difference zero. In such manner, the moving speed of the shuttle 6 is controlled at the target speed when the optical head is moved between the ID portions 44 and 45.

From the ROM 21, output data are supplied to the motor driving servo 24 such that: when the shuttle 6 is moved such that the optical head 2 passes a left side accelerating area of the optical card 41, i.e. left side area of the left side ID portion 44, the shuttle 6 is moved to be accelerated then after the optical head 2 passes over the left side accelerating area of the optical card 41, the shuttle 6 moves at a constant speed between the left side ID portion 44 and the right side ID portion 45; when the optical head 2 becomes to the right side decelerating area, i.e. right side area of the right side ID portion 45, the shuttle 6 is decelerated. In the controller 10, when the output of the up and down counter 27 becomes to a predetermined value, the controlling mode of the shuttle 6 is changed from the moving speed controlling mode to the position controlling mode to stop the movement of the shuttle 6.

In order to transfer the shuttle 6 in the backward direction, the reversed driving direction signal and the driving signal may be supplied to ROM 21 of the motor servo circuit 7 from the controller 10.

To the input terminal of the address decoder 28 provided in the moving speed detection circuit 20, is supplied the output of the up and down counter 27 of the motor servo circuit 7, which represents the positional signal of the shuttle 6. The address decoder 28 is arranged such that the output signal thereof is supplied to the AND gate 30 only when the optical head 2 passes the ID portion 44 in the forward direction and ID portion 45 in the backward direction. The clock pulses for counting pulses in the counter 31 are generated in that clock pulse generator 29, and the clock pulses are supplied to the AND gate 30. The output of AND gate 30 is supplied to a clock terminal of the counter 31, so that the counter 31 is arranged such that the pulses generated in the clock pulse generator 29 are counted when the optical head 2 passes the ID portions 44 and 45. To the clear terminal of the counter 31 is supplied the shuttle driving signal from the controller 10 to make the counter 31 clear when the control mode of the movement of the shuttle 6 is changed from the position controlling mode to the moving speed controlling mode.

In the moving speed detecting circuit 20, a period during which the optical head 2 passes over the ID portion 44 or 45 is detected every time the shuttle 6 is transferred from side to side and thus a moving speed signal of the shuttle 6 is produced thereby. The shorter the detected period, the faster the mean moving speed of the shuttle 6 when the optical head 2 passes over the ID portion 44 or 45; and on the contrary, the longer the detected period, the later the mean moving speed of the shuttle 6.

In the controller 10, a target period during which the optical head 2 passes over the ID portion 44 or 45 is established; and the moving speed signal of the shuttle 6 detected in the circuit 20 is compared to the target period in order to detect a deviation between the mean moving speed of the shuttle 6 and a target moving speed. In case the detected moving speed signal is smaller than the predetermined threshold value, it results in that the mean moving speed of the shuttle 6 during the optical head 2 passes over the ID portion 44 or 45 is faster than the target speed; and in case the shuttle moving speed signal is larger than the predetermined threshold value, it results in that the mean moving speed of the shuttle 6 is later than the target speed.

In the controller 10, it is decided whether optical information should be recorded and/or reproduced on the optical card 41 in accordance with the difference between the mean moving speed of the shuttle 6 and the target speed energy after the optical head 2 has passed over the ID portion 44 or 45. For instance the data portion 46 of the optical card 41 is formed by an information format having a margin of 3% with respect to the length of the data portion 46 of the tracks 43. When the mean moving speed of the shuttle 6 is 3% faster or more than the target speed, optical information is recorded on not only the data portion 46 but also ID portion 44 or 45. Therefore, it may be arranged, for instance, such that when the mean moving speed of the shuttle 6 is 2% faster or more than the target speed optical information is not recorded on the optical card 41. Contrary to the above, in the case that the shuttle 6 moves later by 2% or more than the target speed, the reproducing format margin would be decreased. That is to say, the distance between information pits becomes too short. Therefore, it may be arranged such that when the mean moving speed of the shuttle 6 is later by 2% or more optical information is not recorded on the optical card 41.

According to the apparatus of the present invention, the moving speed of the shuttle 6 is detected by the moving speed detecting circuit 20; and the detected moving speed is compared with the threshold value to detect the fact that the moving speed of the shuttle 6 is deviated from the target speed memorized in the controller 10; additionally, in case the moving speed of the shuttle 6 is largely different from the threshold value, it is arranged such that optical information is not recorded on and/or reproduced from the optical card. In such a case, it may be possible to arrange that the recording of optical information is stopped not only at the ID portions but also at the data portions.

In order to stop to record optical information on the optical card, it may be possible to arrange that modulation is not conducted in the modulating circuit 19; and in order to stop reproduced optical information recorded on the optical card the demodulated signal from the demodulating circuit 16 is refused in the controller 10.

The present invention is not limited to the above stated embodiment, but several changes or alternatives can be applied therefor. For instance, in the above mentioned embodiment, the position of the shuttle 6 with respect to the optical head 2 is detected by means of the rotary encoder 9, but it may be possible to use a linear encoder instead of the rotary encoder 9. Additionally, in the embodiment, the apparatus is arranged such that the shuttle 6 is arranged to be moved in the track direction, but it may be possible to drive the optical head 2 in the track direction.

What is claimed is:

1. An optical information recording/reproducing apparatus, wherein an information recording medium and an optical head are moved relatively in a track direction parallel to a direction of tracks formed on the medium to record optical information on the information recording medium and/or reproducing optical information recorded on the information recording medium after the optical head is moved relatively to the information recording medium in a direction perpendicular to the track direction to seek a desired track, said apparatus comprising:

driving means for causing an optical information recording medium and an optical head to undergo movement relative to one another in the track direction;

position detecting means for detecting a relative position of said optical information recording medium with respect to said optical head and for outputting a positional signal representing said relative position;

moving speed detecting means for detecting a relative moving speed between said optical information recording medium and said optical head in accordance with said positional signal, said moving speed detecting means comprising an address decoder which receives said positional signal, a clock pulse generator, an AND gate and a counter, outputs of said address decoder and said clock pulse generator being supplied to said AND gate, and an output of said AND gate being supplied to the counter; and controlling means for producing a driving signal to control said driving means and for controlling a flow of data to and/or from the optical head to inhibit a recording of optical information on said optical information recording medium and/or a reproduction of optical information recorded on said optical information recording medium when said relative moving speed detected by the moving speed detecting means is deviated from a given speed.

2. An optical information recording/reproducing apparatus according to claim 1, wherein:

said address decoder is arranged such that the output thereof is supplied to the AND gate only when said optical information recording medium or the optical head moves such that the optical head passes one of ID portions formed on said optical information recording medium;

whereby a relative moving speed between said optical information recording medium and the optical head during the optical head passes one of said ID portions is detected.

3. An optical information recording/reproducing apparatus according to claim 2, wherein:

said driving signal is supplied to a clear terminal of said counter of the moving speed detecting circuit from the controller; whereby the output of said counter is made clear every time the optical head passes one of the ID portions.

4. An optical information recording/reproducing apparatus according to claim 1, wherein:

said moving speed of the optical information recording medium with respect to the optical head or the optical head with respect to the optical information recording medium detected by said moving speed detecting circuit is compared to a given threshold value in the controller; and recording and/or reproducing optical information are/is inhibited when said moving speed of said optical information recording medium or said optical head is deviated from said threshold value.

* * * * *